UNITED STATES PATENT OFFICE.

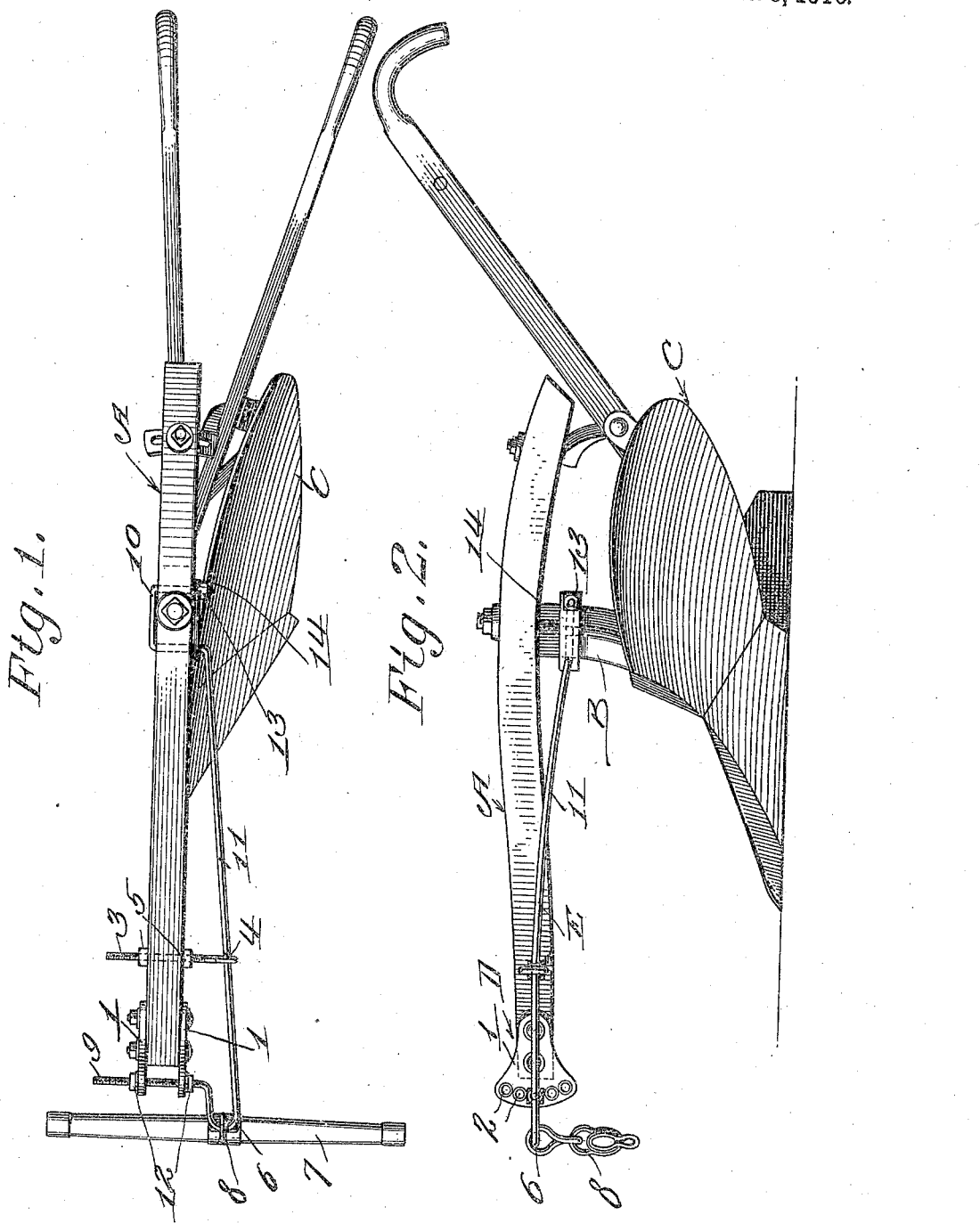

HORATIO W. FLAGG, OF MARTINSBURG, WEST VIRGINIA.

DRAFT ATTACHMENT FOR PLOWS.

951,638. Specification of Letters Patent. Patented Mar. 8, 1910.

Application filed June 29, 1909. Serial No. 505,107.

*To all whom it may concern:*

Be it known that I, HORATIO W. FLAGG, a citizen of the United States, residing at Martinsburg, (R. F. D. No. 4,) Berkeley county, West Virginia, have invented a new and useful Draft Attachment for Plows.

The present invention is an improvement in plows, and its object comprehends the production of a plow so constructed as to permit it to be run close to growing trees, vines, etc., without injury thereto, and to fences, hedges and the like, to keep the same free from grass and weeds. This is effected by means of an extremely simple draft attachment consisting merely of a rod connected at its front, or whiffletree-carrying end to the clevis of the beam, and at its rear end to the standard, and intermediate its ends to said beam, the arrangement being such that the rod is capable of a lateral adjustment toward and from the beam, and also of a vertical adjustment with respect thereto, thereby enabling the draft to be regulated to suit the requirements of the particular occasion.

A structural embodiment of the invention is illustrated in the accompanying drawings, whereof:

Figure 1 is a plan view of a plow equipped with the improved draft attachment thereof, and Fig. 2 is a side elevation of the same.

Reference being had to said drawings, and to the characters marked thereon, A designates in a general manner the beam, of the plow, B the standard, and C the plow body. These parts may be of any conventional or preferred construction, and, therefore, require no extended description. In like manner, the clevis of the plow is designated by the letter D, and the draft rod by the letter E.

The clevis is located at the front end of the beam A, as is customary, and it comprises in the present instance a pair of plates 1 disposed upon opposite sides of said beam and bolted or otherwise fastened thereto, said plates being formed with the usual series of alining perforations 2. A slight distance to the rear of the clevis, there is arranged a horizontal bolt 3 which is passed through a perforation formed in beam A, the ends of the bolt projecting beyond the beam sides. The bolt is threaded, as shown, and is formed at one end with an eye 4, nuts 5 being provided to hold the bolt in adjusted position in the afore-mentioned perforation, *i. e.*, with the eye at the proper distance from the adjacent beam side. These nuts are located upon opposite sides of the beam, and they are arranged to be tightened thereagainst.

The draft rod is bent at its front end to provide a forwardly-extending loop 6 from which the swingletree 7 is suspended by means of a chain 8 or similar device. One side of this loop is formed with an abrupt lateral extension 9 which is threaded, as shown, and is designed for interchangeable insertion in the perforations 2 in the clevis plates. At its rear end, said rod is formed with a lateral hook 10 which projects in the opposite direction from the extension 9 and is adapted to embrace the standard B, the terminal of the bill of the hook being threaded. The body or connecting portion 11 of the rod is passed loosely through the eye in bolt 3 and is bent or set at an angle to the extension 9 and also to the members of the hook 10, which are parallel with said extension, in consequence of which fact it is also arranged or set at an acute angle to beam A.

To retain the hook in adjusted position to said beam, a pair of nuts 12 are threaded upon the extension 9, and a nut 13 on the threaded portion of the hook bill; the first-mentioned nuts are designed to be tightened against the clevis plates 1, and the last-mentioned nut against a metal strap 14 which is arranged transversely of the hook and is formed with openings to permit its attachment thereto, said strap being adapted to bear against the adjacent surface of the standard.

The body portion 11 of the draft rod passes loosely, as above stated, through the eye portion 4 of bolt 3, the diameter of the eye-opening being sufficiently greater than that of the rod to permit a movement of the latter in said eye. Consequently, it will be apparent that after the nuts 12 and 13 have been loosened, a vertical adjustment of the rod with respect to the plow beam may be effected. That is to say, the rod may be rocked in said eye portion as a fulcrum, to regulate the height of the draft, by shifting the position of the extension 9 in the perforations in the clevis, the retention of the rod in adjusted position being obtained by the subsequent tightening of the nuts above referred to. It will also be apparent that the endwise movement of bolt 3 through the perforation in the plow beam, after nuts 5 have been loosened, will cause a lateral movement of the entire body portion of the rod toward or from said beam according to the direction in which the bolt is moved, thereby adjusting the position of the swingletree with respect to the furrow to be plowed.

To permit the accurate positioning of the rod, and to facilitate its attachment to the plow as above described, its rear portion is preferably given a downward inclination, as shown in Fig. 2.

Further description of the invention, and its manner of operation is deemed unnecessary in view of the foregoing.

I claim as my invention:

1. The combination, with a plow having a clevis, of a draft attachment comprising a single member formed at one end with a hook adapted to embrace the plow standard, and at the other end with a lateral extension adapted for engagement in the clevis.

2. The combination, with a plow having a clevis, of a draft attachment comprising a single member formed at its front end with a forwardly-projecting loop having one leg thereof provided with a lateral extension adapted for engagement in the clevis, and at its rear end with a hook adapted to embrace the plow standard; and a whiffletree connected to said loop.

3. The combination, with a plow provided with a beam, a standard and a clevis; of a draft rod adjustably connected intermediate its ends to one side face of the beam; means for adjustably securing the front and rear ends respectively of said rod to the clevis and the standard, whereby said rod may be adjusted with respect to said beam in both a vertical and an approximately-horizontal plane; and a whiffletree attached to the front end of said rod.

4. The combination, with a plow provided with a beam, a standard, and a clevis, and having an endwise movable horizontal bolt set into said beam; of a draft rod adjustably connected intermediate its ends to said bolt; means for adjustably securing the front and rear ends respectively of said rod to the clevis and the standard, whereby said rod may be adjusted with respect to said beam in both vertical and an approximately-horizontal plane; and a whiffletree attached to the front end of said rod.

5. A plow having a clevis attached to the front end of its beam; an endwise-adjustable eye-bolt passed through said beam rearward of the clevis; and a draft rod having its body portion passed loosely through the eye of said bolt, said draft rod being provided at its front end with a lateral extension adapted for engagement in said clevis, and at its rear end with a hook adapted to embrace the plow standard.

H. W. FLAGG.

Witnesses:
MAUDE E. MATTHEUS,
L. DE W. GERHARDT.